(12) United States Patent
Beeput

(10) Patent No.: US 11,751,504 B2
(45) Date of Patent: Sep. 12, 2023

(54) WEED TRIMMING HEAD ASSEMBLY

(71) Applicant: Garnet Beeput, Carmel, IN (US)

(72) Inventor: Garnet Beeput, Carmel, IN (US)

(*) Notice: Subject to any disclaimer, the term of this patent is extended or adjusted under 35 U.S.C. 154(b) by 267 days.

(21) Appl. No.: 17/234,042

(22) Filed: Apr. 19, 2021

(65) Prior Publication Data

US 2022/0330478 A1   Oct. 20, 2022

(51) Int. Cl.
*A01D 34/416* (2006.01)

(52) U.S. Cl.
CPC ..... *A01D 34/4166* (2013.01); *A01D 34/4165* (2013.01)

(58) Field of Classification Search
CPC ............ A01D 34/4161; A01D 34/4165; A01D 34/46; A01D 34/4166
See application file for complete search history.

(56) References Cited

U.S. PATENT DOCUMENTS

| | | | | |
|---|---|---|---|---|
| 4,685,279 A * | 8/1987 | Gullett | ................. | A01D 34/416 30/276 |
| 5,048,278 A * | 9/1991 | Jones | ................. | A01D 34/4166 30/276 |
| 5,303,476 A * | 4/1994 | Tuggle | ............... | A01D 34/4166 30/276 |
| 6,094,823 A * | 8/2000 | Brown | ................. | A01D 34/416 30/276 |
| 6,176,015 B1 * | 1/2001 | Morabit | ............. | A01D 34/4168 30/276 |
| 6,314,848 B2 * | 11/2001 | Morabit | ............. | A01D 34/4166 83/13 |
| 7,257,898 B2 | 8/2007 | Iacona | | |
| 8,863,395 B2 | 10/2014 | Alliss | | |
| 9,078,394 B2 | 7/2015 | Harless | | |
| 10,070,583 B2 | 9/2018 | Jerez | | |
| 10,440,881 B2 | 10/2019 | Jerez | | |
| 10,517,210 B2 | 12/2019 | Cabrera | | |
| 10,631,458 B2 * | 4/2020 | Morabit | ............. | A01D 34/4166 |
| 2016/0143220 A1 * | 5/2016 | Child | ................. | A01D 34/4166 30/276 |
| 2019/0343039 A1 | 11/2019 | Chung | | |

FOREIGN PATENT DOCUMENTS

WO   WO2006017372   2/2006

* cited by examiner

*Primary Examiner* — Abigail A Risic

(57) ABSTRACT

A weed trimming head assembly includes a hub that has a plurality of arms each radiating outwardly between a central coupling and an outer ring. Each of the arms has a channel integrated into the arms and the channel extends between the central coupling and the outer ring. A plurality of trimming lines is provided and each of the trimming lines is slidably insertable into the channel in a respective one of the arms. Moreover, each of the trimming lines extends outwardly from the outer ring of the hub. In this way each of the trimming lines can trim grass when the hub is rotated by the weed trimmer.

4 Claims, 5 Drawing Sheets

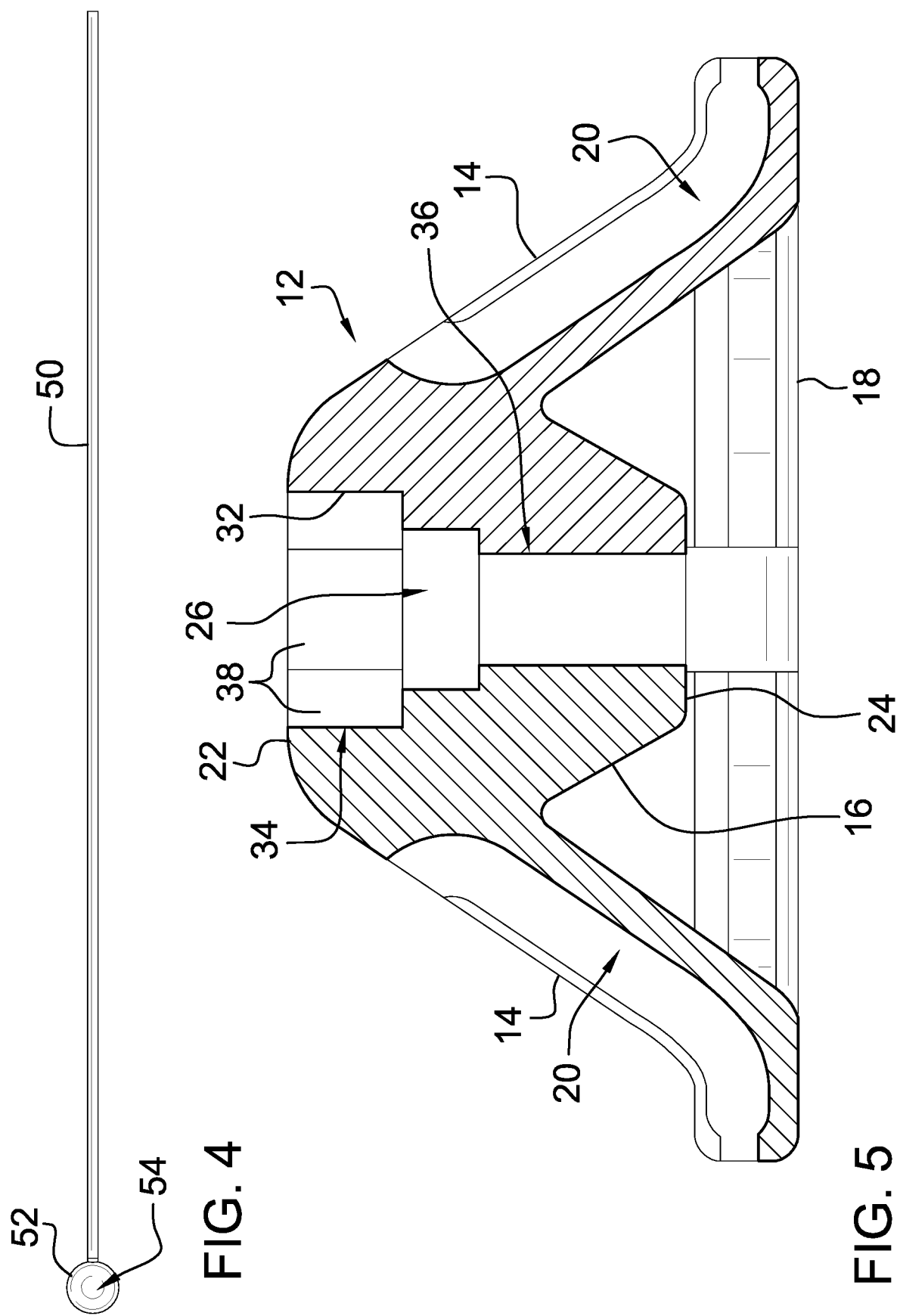

WEED TRIMMING HEAD ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to trimming head device and more particularly pertains to a new trimming head device for easily removing and replacing trimming lines on a weed trimmer. The device includes a hub which has a plurality of channels integrated therein.

The device additionally includes a plurality of trimming lines that can each be slidably positioned in a respective one the channels in the hub. In this way the trimming lines can quickly replaced when the trimming lines become worn down from trimming.

(2) Description of Related Art Including Information Disclosed Under 37 CFR 1.97 and 1.98

The prior art relates to trimming head device including a variety of weed trimmer heads that include trimming lines that are compressed between respective portions of a hub. In each instance the weed trimmer head requires disassembly for replacing the trimming lines. The prior art discloses a variety of weed trimmer heads that include a mechanical engagement for releasably engaging weed trimmer lines. In no instance does the prior art disclose a weed trimmer head that includes channels integrated into a hub that can insertably receive an end of a trimming line for quickly removing and replacing trimming lines.

BRIEF SUMMARY OF THE INVENTION

An embodiment of the disclosure meets the needs presented above by generally comprising a hub that has a plurality of arms each radiating outwardly between a central coupling and an outer ring. Each of the arms has a channel integrated into the arms and the channel extends between the central coupling and the outer ring. A plurality of trimming lines is provided and each of the trimming lines is slidably insertable into the channel in a respective one of the arms. Moreover, each of the trimming lines extends outwardly from the outer ring of the hub. In this way each of the trimming lines can trim grass when the hub is rotated by the weed trimmer.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 4 is a perspective view of a trimming line of an embodiment of the disclosure.

FIG. 5 is a cross sectional view taken along line 5-5 of FIG. 2 of an embodiment of the disclosure.

DETAILED DESCRIPTION OF THE INVENTION

Figure 1:
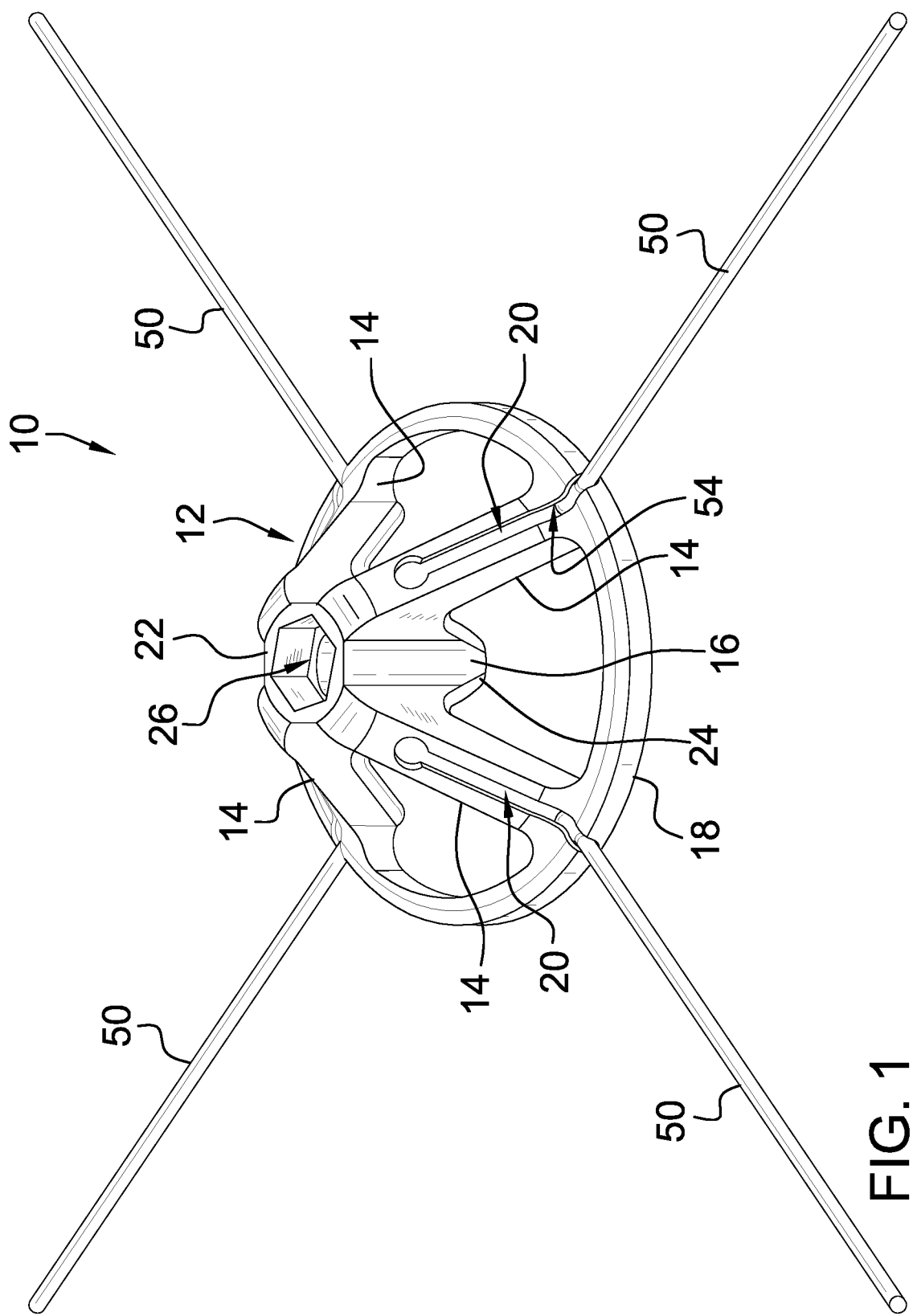
FIG. 1 is a top perspective view of a weed trimming head assembly according to an embodiment of the disclosure.
Figure 2:
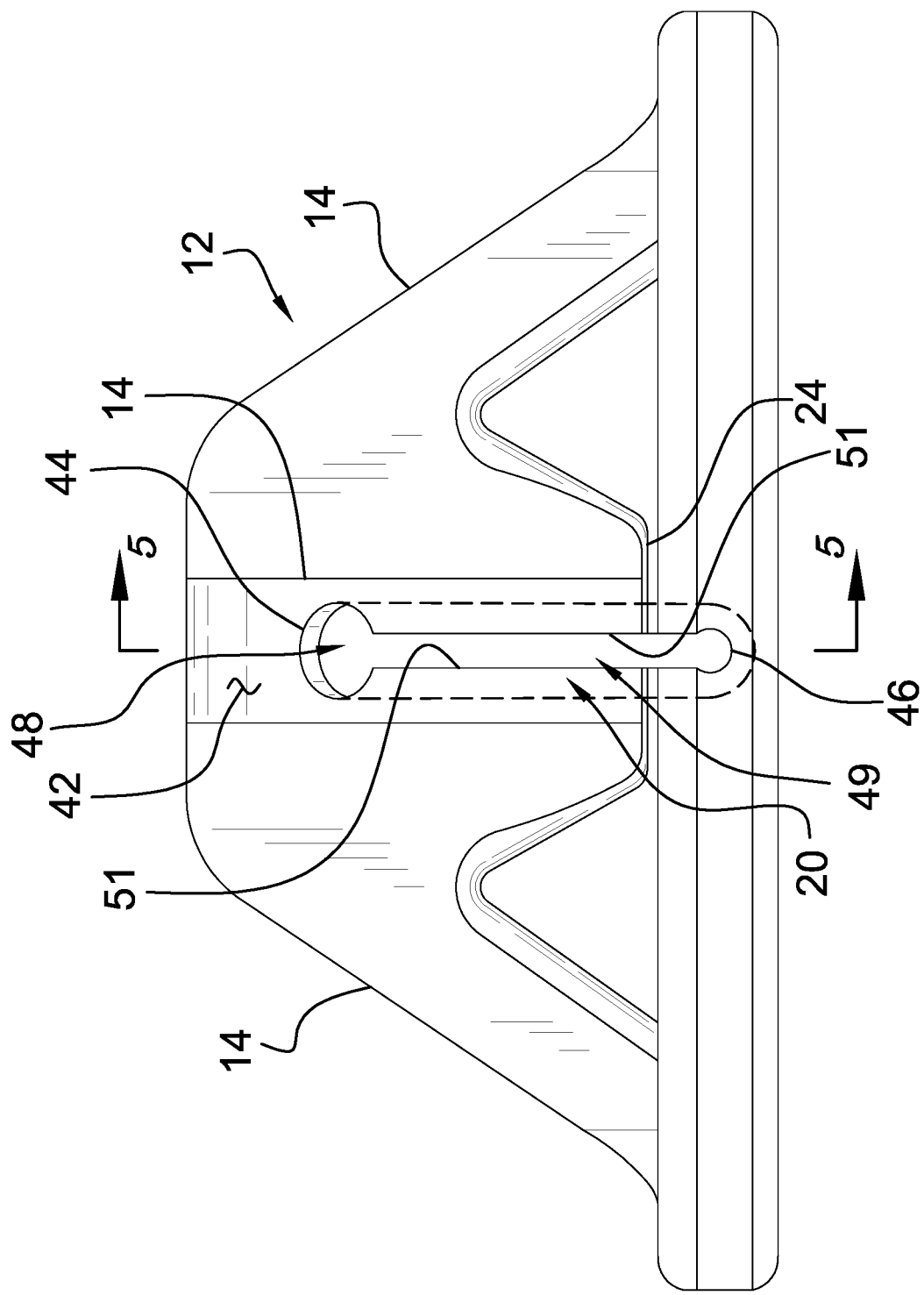
FIG. 2 is a front view of an embodiment of the disclosure.
Figure 3:
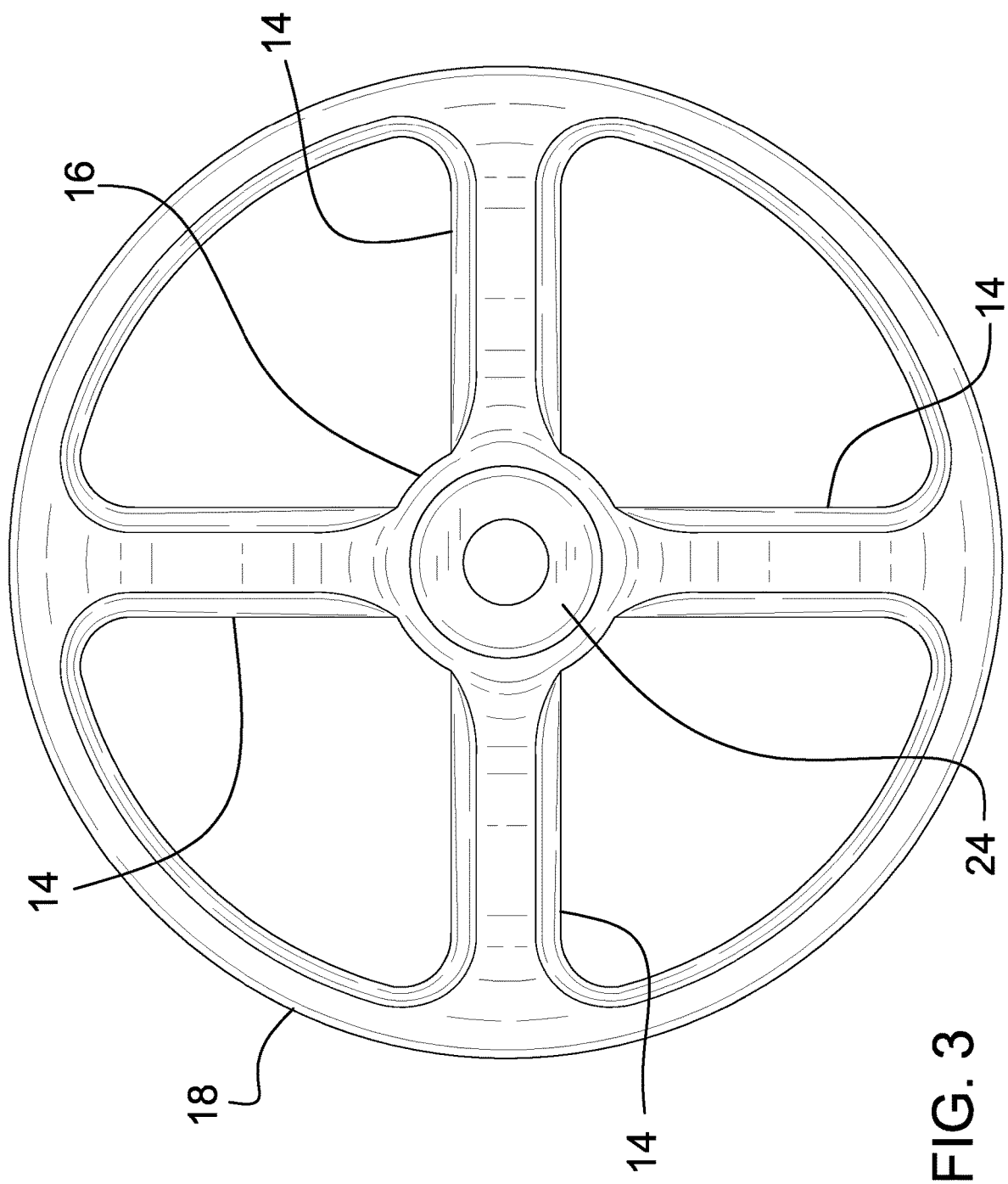
FIG. 3 is a bottom view of an embodiment of the disclosure.
Figure 6:
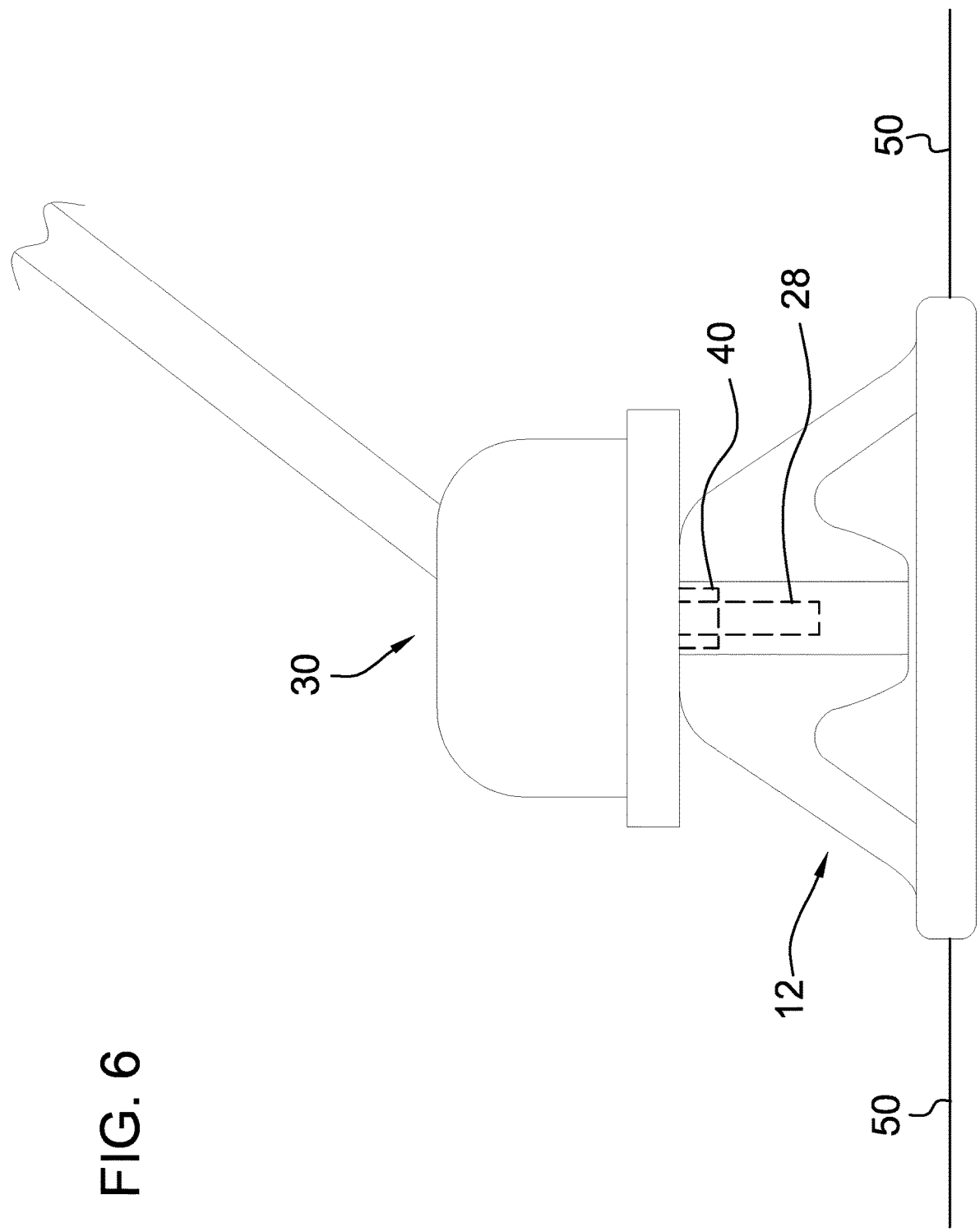
FIG. 6 is a perspective in-use view of an embodiment of the disclosure.

With reference now to the drawings, and in particular to FIGS. 1 through 6 thereof, a new trimming head device embodying the principles and concepts of an embodiment of the disclosure and generally designated by the reference numeral 10 will be described.

As best illustrated in FIGS. 1 through 6, the weed trimming head assembly 10 generally comprises a hub 12 that has a plurality of arms 14 each radiating outwardly between a central coupling 16 and an outer ring 18. Each of the arms 14 has a channel 20 integrated into the arms 14 and the channel 20 extends between the central coupling 16 and the outer ring 18. The central coupling 16 has a primary end 22 and a secondary end 24, and the central coupling 16 has a hole 26 extending through the primary end 22 and the secondary end 24. The hole 26 receives a drive shaft 28 of a weed trimmer 30 thereby facilitating the hub 12 to be rotated by the weed trimmer 30, and the hole 26 extends along an axis that is oriented perpendicular to a plane of a circle 48 defined by the outer ring 18.

The hole 26 has a bounding surface 32, and the bounding surface 32 includes an upper portion 34 that has a diameter which is greater than the diameter of a lower portion 36. The upper portion 34 has a plurality of intersecting sides 38 such that the upper portion 34 has a polygonal shape. In this way the upper portion 34 can conform to a nut 40 threaded onto the drive shaft 28. The central coupling 16 may have a length ranging between approximately 2.0 inches and 3.0 inches, and the outer ring 18 may have a diameter ranging between approximately 4.0 inches and 5.0 inches.

Each of the arms 14 has an outwardly facing surface 42, and the outwardly facing surface 42 of each of the arms 14 slopes downwardly from the primary end 22 of the central coupling 16. Moreover, the secondary end 24 of the central coupling 16 is aligned with the outer ring 18 such that the outer ring 18 is spaced from the weed trimmer 30 when the drive shaft 28 is extended into the primary end 22 of the central coupling 16. The channel 20 in each of the arms 14 extends through the outwardly facing surface 42, and the channel 20 in each of the arms 14 has an upper end 44 and a lower end 46. The upper end 44 is rounded into a circle 48 and the lower end 46 is positioned adjacent to the outer ring 18. Additionally, an interior of the channel 20 has a width that is greater than the width of a space 49 defined by a bounding edge 51 of the channel 20 on the outwardly facing surface 42.

A plurality of trimming lines 50 is provided and each of the trimming lines 50 is slidably insertable into the channel 20 in a respective one of the arms 14. Moreover, each of the trimming lines 50 extends outwardly from the outer ring 18 of the hub 12 to trim grass when the hub 12 is rotated by the weed trimmer 30. Each of the trimming lines 50 may be comprised of a flexible material such as monofilament or other similar type of material that would commonly be employed with weed trimmer 30s. Each of the trimming lines 50 may have a length of approximately 6.0 inches.

Each of the trimming lines 50 has a first end 52 and the first end 52 is rounded into a ball 54. The ball 54 is insertable through the circle 48 on the upper end 44 of the channel 20 in the respective arm 14. Additionally, the ball 54 has a diameter that is greater than the width of the bounding edge 51 of the channel 20 in the respective arm 14. In this way the trimming lines 50 are inhibited from being removed from the channel 20 in the respective arm 14. Additionally, each of the trimming lines 50 is positioned at the outer ring 18 when the trimming lines 50 are fully seated in the channel 20 in the respective arm 14. Each of the trimming lines 50 is slidably upwardly toward the circle 48 on the upper end 44 of the channel 20 in the respective arm 14 for removing the trimming lines 50 for replacement.

In use, the central coupling 16 is mounted to the drive shaft 28 of the weed trimmer 30 such the arms 14 angle away from the weed trimmer 30. The ball 54 on each of the trimming lines 50 is inserted through the circle 48 on the channel 20 in the respective arm 14 and each of the trimming lines 50 is slid downwardly to the outer ring 18. In this way the trimming lines 50 are inhibited from being removed from the respective arm 14 when the hub 12 is rotated. Additionally, the trimming lines 50 can be quickly and easily replaced when they become worn down or shortened from trimming weeds.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A weed trimming head assembly having quick release cutting lines for enhancing removing and replacing the cutting lines, said assembly comprising:

a hub having a plurality of arms each radiating outwardly between a central coupling and an outer ring, each of said arms having a channel being integrated into said arms, said channel extending between said central coupling and said outer ring, said central coupling having a primary end and a secondary end, said central coupling having a hole extending through said primary end and said secondary end wherein said hole is configured to receive a drive shaft of a weed trimmer thereby facilitating said hub to be rotated by the weed trimmer; and a plurality of trimming lines, each of said trimming lines being slidably insertable into said channel in a respective one of said arms, each of said trimming lines extending outwardly from said outer ring of said hub wherein each of said trimming lines is configured to trim grass when said hub is rotated by the weed trimmer;

wherein said hole extends along an axis being oriented perpendicular to a plane of a circle defined by said outer ring said hole having a bounding surface, said bounding surface having an upper portion having a diameter being greater than the diameter of a lower portion. said upper portion having a plurality of intersecting sides such that said upper portion has a polygonal shape wherein said upper portion is configured to conform to a nut threaded onto the drive shaft;

wherein each of said arms has an outwardly facing surface, said outwardly facing surface of each of said arms sloping downwardly from said primary end of said central coupling having said secondary end of said central coupling being aligned with said outer ring wherein said outer ring is configured to be spaced from the weed trimmer when the drive shaft is extended into said primary end of said central coupling; and wherein said channel in each of said arms extends through said outwardly facing surface, said channel in each of said arms having an upper end and a lower end, said upper end being rounded into a circle, said lower end being positioned adjacent to said outer ring, an interior of said channel having a width being greater than the width of a spaced defined by a bounding edge of said channel on said outwardly facing surface.

2. The assembly according to claim 1, wherein each of said trimming lines has a first end, said first end being rounded into a ball, said ball being insertable through said circle on said upper end of said channel in said respective arm, said ball having a diameter being greater than the width of said spaced defined by said hounding edge of said channel in said respective arm thereby inhibiting said member from being removed from said channel in said respective arm..

3. The assembly according to claim 1, wherein each of said trirmning lines is positioned at said outer ring when said trimming lines are fully seated in said channel in said respective arm, each of said trimming lines being slidably upwardly toward said circle on said upper end of said channel in said respective arm for removing said trimming lines for replacement.

4. A weed trimming head assembly having quick release cutting lines for enhancing removing and replacing the cutting lines, said assembly comprising:

a hub having a plurality of arms each radiating outwardly between a central coupling and an outer ring, each of said arms having a channel being integrated into said arms, said channel extending between said central coupling and said outer ring, said central coupling having a primary end and a secondary' end, said central coupling having a hole extending through said primary end and said secondary end wherein said hole is configured to receive a drive shaft of a weed trimmer thereby facilitating said hub to be rotated by the weed trimmer, said hole extending along an axis being oriented perpendicular to a plane of a circle defined by said outer ring, said hole having a bounding surface, said bounding surface having an upper portion having a diameter being greater than the diameter of a lower portion, said upper portion having a plurality of intersecting sides such that said upper portion has a polygonal shape wherein said upper portion is configured to conform to a nut threaded onto the drive shaft, each of said arms having an outwardly facing surface, said outwardly facing surface of each of said arms sloping downwardly from said primary end of said central coupling having said secondary end of said central coupling being aligned with said outer ring wherein said outer ring is configured to be spaced from the weed trimmer when the drive shaft is extended into said primary end of said central coupling, said channel in each of said arms extending through said outwardly facing surface, said channel in each of said arms having an upper end and a lower end, said upper end being rounded into a circle, said lower end being positioned adjacent to said outer ring, an interior of said channel having a width being greater than the width of a spaced defined by a bounding edge of said channel on said outwardly facing surface; and a plurality of trimming lines, each of said trimming lines being slidably insertable into said channel in a respective one of said arms, each of said trimming lines extending outwardly from said outer ring of said hub wherein each of said trimming lines is configured to trim grass when said hub is rotated by the weed trimmer, each of said trimming lines having a first end, said first end being rounded into a ball, said ball being insertable through said circle on said upper end of said channel in said respective arm, said ball having a diameter being greater than the width of said bounding edge of said channel in said respective arm thereby inhibiting said member from being removed from said channel in said respective arm, each of said trimming lines being positioned at said outer ring when said trimming lines are fully seated in said channel in said respective arm, each of said trimming lines being slidably upwardly toward said circle on said upper end of said channel in said respective arm for removing said trimming lines for replacement.

* * * * *